United States Patent
Xu

(10) Patent No.: US 12,159,197 B2
(45) Date of Patent: Dec. 3, 2024

(54) QUBIT DETECTION SYSTEM AND DETECTION METHOD

(71) Applicant: ALIBABA GROUP HOLDING LIMITED, Grand Cayman (KY)

(72) Inventor: Hua Xu, Burlingame, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 883 days.

(21) Appl. No.: 17/189,719

(22) Filed: Mar. 2, 2021

(65) Prior Publication Data
US 2021/0182727 A1    Jun. 17, 2021

Related U.S. Application Data

(63) Continuation of application No. PCT/CN2019/103246, filed on Aug. 29, 2019.

(30) Foreign Application Priority Data

Sep. 5, 2018 (CN) .......................... 201811029930.4

(51) Int. Cl.
G06N 10/40          (2022.01)
(52) U.S. Cl.
CPC .................................. *G06N 10/40* (2022.01)
(58) Field of Classification Search
None
See application file for complete search history.

(56) References Cited

U.S. PATENT DOCUMENTS 6,078,359 A * 6/2000 Conder ................ H05K 3/4641
                                                          348/E5.025
9,530,873 B1   12/2016 Carroll et al.
(Continued)

FOREIGN PATENT DOCUMENTS

CN          107300629 A        10/2017
CN          107612688 A         1/2018
(Continued)

OTHER PUBLICATIONS

Japanese Office Action issued in corresponding Japanese Application No. 2021-510187 on Jul. 26, 2023 (7 pages).
(Continued)

*Primary Examiner* — Roy Y Yi
(74) *Attorney, Agent, or Firm* — Finnegan, Henderson, Farabow, Garrett & Dunner, LLP

(57) ABSTRACT

Methods for qubit detection include: imaging, via an imaging device, a qubit to obtain an image; inputting the image to a machine learning model; and outputting, by the machine learning model, prediction information based on the image. Systems for qubit detection include: a test module including an imaging device configured to provide an image of a qubit; and a prediction module communicatively coupled to the test module and including a machine learning model configured to output prediction information based on the image provided by the test module. Devices for qubit detection include: a non-transitory computer-readable storage medium storing an instruction set; and a processor configured to execute the instruction set to cause the device to perform controlling an imaging device to image a qubit to obtain an image; inputting the image to a machine learning model; and controlling the machine learning model to output prediction information based on the image.

20 Claims, 2 Drawing Sheets

(56) References Cited

U.S. PATENT DOCUMENTS

| | | | |
|---|---|---|---|
| 2003/0055513 A1* | 3/2003 | Raussendorf | B82Y 10/00 700/1 |
| 2006/0056630 A1 | 3/2006 | Zimmer et al. | |
| 2016/0104073 A1 | 4/2016 | Sandberg et al. | |
| 2017/0330101 A1 | 11/2017 | Hastings et al. | |
| 2019/0212766 A1* | 7/2019 | Monroe | G06E 3/005 |
| 2020/0033511 A1* | 1/2020 | Kim | G02B 3/06 |
| 2020/0342345 A1* | 10/2020 | Farhi | G06N 3/084 |

FOREIGN PATENT DOCUMENTS

| | | |
|---|---|---|
| CN | 108257132 A | 7/2018 |
| CN | 108291878 A | 7/2018 |
| CN | 108369668 A | 8/2018 |
| JP | 2008298612 A | 12/2008 |
| WO | WO 2018/106556 A1 | 6/2018 |
| WO | WO 2020/048375 A1 | 3/2020 |

OTHER PUBLICATIONS

Japanese Search Report issued in corresponding Japanese Application No. 2021-510187 on Jun. 23, 2023 (32 pages).

Yamaguchi, Koji, "The forefront of quantum and nanodevice research—from Quantum Computing to Nanomachine Technology," NTT R&D Forum 2012 Workshop Special, pp. 41-45, 2012.

PCT International Search Report and Written Opinion mailed Dec. 4, 2019 issued in corresponding International Application No. PCT/CN2019/103246 (9 pgs.).

First Chinese Office Action issued in Chinese Application No. 201811029930.4 dated May 7, 2021, 8 pages.

European Patent Office Communication issued for Application No. 19858129.0 the Supplementary European Search Report (Art. 153(7) EPC) and the European search opinion dated Oct. 15, 2021, 76 pages.

Kalantre et al., "Machine learning techniques for state recognition and autotuning in quantum dots," Quantum Information, 2019, 10 pages.

Vasudevan et al., "Mapping mesoscopic phase evolution during E-beam induced transformations via deep learning of atomically resolved images," Computational Materials, 2018, 9 pages.

* cited by examiner

QUBIT DETECTION SYSTEM AND DETECTION METHOD

CROSS-REFERENCE TO RELATED APPLICATIONS

This application claims priority to International Application PCT/CN2019/103246, filed on Aug. 29, 2019, which claims priority to Chinese Patent Application No. 201811029930.4, filed on Sep. 5, 2018, the content of which is incorporated herein by reference in its entirety.

TECHNICAL FIELD

The present disclosure relates to the field of detection, and in particular, to a qubit detection system and detection method.

BACKGROUND

Quantum computing and quantum information is a cross-discipline for realizing computing and information processing tasks based on principles of quantum mechanics, and is closely related to quantum physics, computer science, informatics, and other disciplines. It has been developed rapidly in the last two decades. Quantum computer-based quantum algorithms in factorization, unstructured search, and other scenarios have shown the performance far beyond that of existing algorithms based on classical computers, and this direction is thus expected to exceed the existing computing power.

One of the basic characteristics of a quantum computer is that the information unit it uses is not a bit, but a qubit. Qubits can be particles like electrons, or other quasi-particles that are in elementary excitation. For an electron, an "up" state of its spin (a "spin-up state") can be represented as 1, and a "down" state of its spin (a "spin-down state") can be represented as 0. A quantum state with both spin-up and spin-down states is called a superposition state. A small number of particles in a superposition state can carry a large amount of information. For example, the superposition state of only 100 particles can represent numbers from 1 to 2100. A quantum computer can use laser pulses to hit particles for preparing qubits, or use such methods to manipulate qubits.

Typically, implementation methods of qubits includes superconducting Josephson junctions, ion traps, magnetic resonance, topological quantum, or the like. Researchers generally use electronic equipment to detect qubits obtained from preparation, for determining whether the qubits obtained from preparation have defects, and obtaining preliminary property parameters thereof. However, this type of methods can be time-consuming and labor-intensive. For example, for qubits based on superconducting Josephson junctions, the detection needs to be performed in a low temperature environment (e.g., at a liquid-helium temperature), and the cost of obtaining a low temperature environment can be very high. Therefore, the cost of detection in a low temperature environment can also be very high. On the other hand, the detection of qubits in the prior art can only be performed after completing preparation of the qubits. In other words, if a defect occurs in the preparation of the qubits, it cannot be detected by the detection methods disclosed in the prior art. Thus, the detection means for qubits in the prior art can be not only costly but also difficult to prepare qubits in a context of large-scale industrialization.

Based on the above, a qubit detection device and method are desired to solve the above technical problems.

SUMMARY OF THE DISCLOSURE

Embodiments of the present disclosure provide a computer-implemented method for qubit detection including: imaging, via an imaging device, a qubit to obtain an image; inputting the obtained image to a machine learning model; and outputting, by the machine learning model, prediction information based on the obtained image.

Embodiments of the present disclosure also provide a system for qubit detection including: a test module including an imaging device configured to provide an image of a qubit; and a prediction module communicatively coupled to the test module and including a machine learning model configured to output prediction information based on the image provided by the test module.

Embodiments of the present disclosure also provide a device for qubit detection including: a non-transitory computer-readable storage medium storing an instruction set; and one or more processors configured to execute the instruction set to cause the device to perform controlling an imaging device to image a qubit to obtain an image; inputting the obtained image to a machine learning model; and controlling the machine learning model to output prediction information based on the obtained image.

BRIEF DESCRIPTION OF THE DRAWINGS

The accompanying drawings described here are used to provide a further understanding of the present disclosure and constitute a part of the present disclosure. The example embodiments of the present disclosure and descriptions thereof are used to explain the present disclosure, and do not constitute an improper limitation to the present disclosure. In the accompanying drawings.

DETAILED DESCRIPTION

Figure 1:
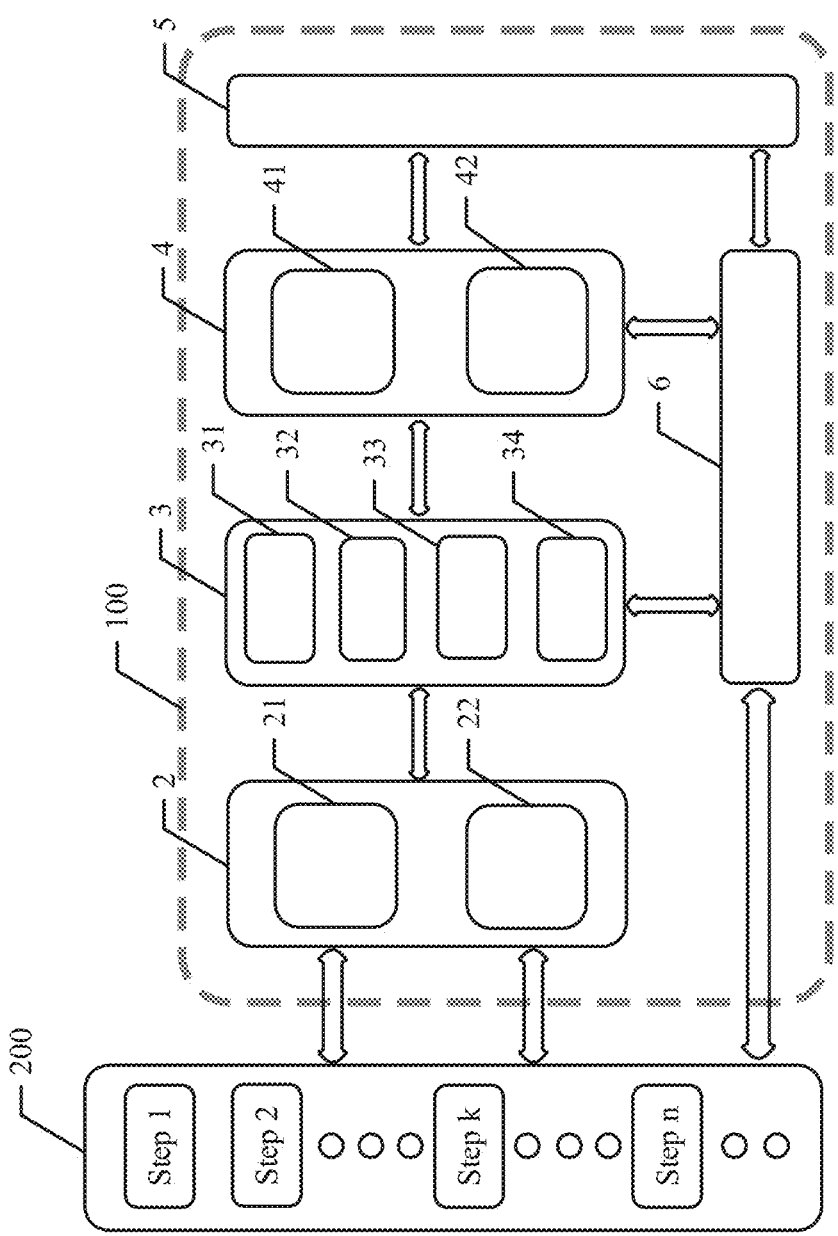
FIG. 1 is a framework diagram illustrating an example qubit detection system, consistent with some embodiments of this disclosure.

The foregoing summary and the following detailed description of certain embodiments will be better understood when read with reference to the accompanying drawings. In terms of simplified diagrams illustrating functional blocks of some embodiments, the functional blocks do not necessarily indicate the division between hardware circuits. Thus, for example, one or more of the functional blocks (such as a processor or a memory) can be implemented in a single piece of hardware (such as a general-purpose signal processor or a piece of random access memory, a hard disk, or the like) or multiple pieces of hardware. Similarly, a program can be an independent program, can be combined into a routine in the operating system, can be a function in an installed software package, or the like. It should be understood that some embodiments are not limited to the arrangements and tools shown in the drawings.

As used in the present disclosure, elements or steps recited in the singular or started with the word "a" or "an" should be understood as not excluding the plural of the elements or steps, unless such exclusion is clearly stated. In addition, references to "one embodiment" are not intended to be interpreted as excluding the existence of additional embodiments that also incorporate the recited features. Unless the contrary is clearly stated, embodiments that "include," "comprise," or "have" an element or elements having a particular attribute can include additional such element(s) not having that attribute.

FIG. 1 is a framework diagram illustrating an example qubit detection system 100, consistent with some embodiments of this disclosure. Besides qubit detection system 100, FIG. 1 also illustrates a qubit preparation process 200, a test module 2, an imaging device 21, a detection device 22, a test control module 3, an imaging data generation module 31, an imaging data reading module 32, a qubit test generation module 33, a qubit test data reading module 34, a prediction module 4, a qubit-defect determination and property-prediction module 41, a machine learning model 42, an interaction module 5, and a monitoring module 6.

Qubit detection system 100 shown on the right side of FIG. 1 includes test module 2, test control module 3, prediction module 4, interaction module 5, and monitoring module 6. Qubit preparation process 200 shown on the left side of FIG. 1 can include a plurality of steps, including step 1, step 2, . . . , step k, . . . , and step n shown in FIG. 1.

In some embodiments, test module 2 can include imaging device 21 and detection device 22. Imaging device 21 can be a scanning electron microscope (SEM), and detection device 22 can be any device capable of detecting qubits. The scanning electron microscope can image qubits at any step in the qubit preparation process.

In some embodiments, imaging device 21 can be a scanning tunneling microscope (STM), and detection device 22 can be any electronic device capable of detecting qubits. The scanning tunneling microscope can be configured to image qubits at any step in the qubit preparation process.

In some embodiments, imaging device 21 can include other imaging devices, such as an infrared imaging device or an optical imaging device in a visible light frequency range. These devices can be used for imaging qubits at any step in the qubit preparation process.

In some embodiments, test control module 3 can include imaging data generation module 31, imaging data reading module 32, qubit test generation module 33, and qubit test data reading module 34. Test control module 3 can be in a communication connection with test module 2.

In some embodiments, imaging data generation module 31 can generate a test request (such as including an imaging parameter or an imaging time) for imaging, and send the generated imaging test request to imaging device 21. Imaging device 21 can perform a test based on the test request, obtain an image, and collect parameters during imaging. Then, the obtained image and the collected parameters can be sent to imaging data reading module 32. In some embodiments, when imaging device 21 is a scanning electron microscope (SEM), imaging data generating module 31 can generate an SEM test request, send the test request to the SEM, control the SEM to perform the test, and generate an SEM image with parameters collected during the SEM imaging process. The generated SEM image can include one or more images. When the generated SEM images include multiple images, the multiple images can be obtained continuously or at intervals. The generated SEM images and the collected parameters can be sent to imaging data reading module 32.

In some embodiments, when imaging device 21 is a scanning tunneling microscope (STM), data generation module 31 can generate an STM test request, send the test request to the STM, control the STM to perform the test, and generate an STM image with parameters collected during the STM imaging process. The generated STM image can include one or more images. When the generated STM images include multiple images, the multiple images can be obtained continuously or at intervals. The generated STM images and collected parameters can be sent to imaging data reading module 32.

In some embodiments, imaging device 21 can be an optical imaging device in a visible light frequency range, such as a photosensitive coupling device (CCD). The optical imaging device can be used to image qubits at one or more steps in the preparation process, and the obtained image can include one or more images. When the obtained images include multiple images, the multiple images can be obtained continuously or at intervals. The obtained images can be sent to imaging data reading module 32.

In some embodiments, imaging device 21 can be an infrared imaging device. The infrared imaging device can be used to image qubits at one or more steps in the preparation process. The obtained image can include one or more images. When the obtained images include multiple images, the multiple images can be obtained continuously or at intervals. The obtained images can be sent to imaging data reading module 32.

In some embodiments, imaging device 21 can be an ultraviolet imaging device. The ultraviolet imaging device can be used to image qubits at one or more steps in the preparation process. The obtained image can include one or more images. When the obtained images include multiple images, the multiple images can be obtained continuously or at intervals. The obtained images can be sent to imaging data reading module 32.

In some embodiments, qubit test generation module 33 can generate a test request for detecting qubits and send the generated test request to detection device 22. Detection device 22 can perform the test based on the test request and acquires a test result. The test results can include a working frequency of the qubits, a coherence time of the qubits, a coupling strength of the qubits, or the like. The obtained test results can be sent to qubit test data reading module 34.

In some embodiments, prediction module 4 can include qubit-defect determination and property-prediction module 41 and machine learning model 42. Prediction module 4 can be in a communication connection with test control module 3.

In some embodiments, machine learning model 42 can include a trained convolutional neural network (CNN) model. The training data of the convolutional neural network can include a qubit design drawing (e.g., a GDS file) input by a user, an image (e.g., including the image itself, parameters during image collection, test requests for imaging, or the like) acquired in a qubit preparation process and transmitted by imaging data reading module 32. The training data can further include test results or test parameters obtained by testing the qubits with detection device 22 and transmitted by qubit test data reading module 34. For example, the test results can include a working frequency of the qubits, a coherence time of the qubits, a coupling strength of the qubits, or the like.

In some embodiments, the imaging device 21 can be an SEM. The training data of the convolutional neural network can include a qubit design drawing (e.g., a GDS file) input by a user, an SEM image (e.g., including the SEM image itself, parameters during SEM image collection, test requests for SEM imaging, or the like) acquired in a qubit preparation process and transmitted by imaging data reading module 33. The training data can further include test results or test parameters obtained by testing the qubits with detection device 22 and transmitted by qubit test data reading module 34. For example, the test results can include a working frequency of the qubits, a coherence time of the qubits, a coupling strength of the qubits, or the like.

In some embodiments, the imaging device 21 can be an STM. The training data of the convolutional neural network can include a qubit design drawing (e.g., a GDS file) input by a user, an STM image (e.g., including the STM image itself, parameters during STM image collection, test requests for STM imaging, or the like) acquired in a qubit preparation process and transmitted by imaging data reading module 33. The training data can further include test results or test parameters obtained by testing the qubits with detection device 22 and transmitted by qubit test data reading module 34. For example, the test results can include a working frequency of the qubits, a coherence time of the qubits, a coupling strength of the qubits, or the like.

In some embodiments, the imaging device can be an optical device. In particular, the optical device can include an imaging device in a visible light frequency range, or an infrared imaging device. Similar to the above-described SEM or STM imaging device, images formed by the optical device (e.g., the imaging device in the visible light frequency range or the infrared imaging device), parameters collected during imaging, or test requests for imaging can be used as a training input of machine learning model 42 (e.g., the convolutional neural network).

In some embodiments, after the training of the convolutional neural network is completed, the property of the qubits can be determined and predicted based on the actual input, and the result of the determination and prediction can be transmitted to qubit-defect determination and property-prediction module 41. The actual input can include results of the tests performed in the qubit preparation process, for example. In some embodiments, SEM imaging of the qubits can be performed in the qubit preparation process using an SEM device at any step in the preparation process. The imaging data can be transmitted to the trained convolutional neural network for providing quantitative information of the qubits (e.g., including a working frequency of the qubits, a coherence time of the qubits, a coupling strength of qubits, or the like). The quantitative information can be further transmitted to qubit-defect determination and property-prediction module 41 for output. Qubit-defect determination and property-prediction module 41 can directly output the quantitative information, or can provide, based on the quantitative information, qualitative information such as classification of qubit properties.

In some embodiments, the training of the convolutional neural network can be performed based on different types of qubits and different qubit designs. In addition, prepared qubit samples can be regularly tested to obtain test values of the properties of the qubits (e.g., a working frequency of the qubits, a coherence time of the qubits, or a coupling strength of the qubits). By comparing real qubit property measurement values with predicted values of the convolutional neural network, it can be determined whether the convolutional neural network needs to be retrained and adjusted.

In some embodiments, machine learning model 42 can be a deep neural network (DNN) model or a recurrent neural network (RNN) model. The training process and output process of the DNN and the RNN can be similar to those of the convolutional neural network (CNN) described herein. It should be noted that machine learning model 42 can also use any other algorithm and is not limited to the examples described in this disclosure.

In some embodiments, qubit detection system 100 can further include interaction module 5 and monitoring module 6. Interaction module 5 can be in a communication connection to prediction module 4 and monitoring module 6. Monitoring module 6 can be in a communication connection to test control module 3, prediction module 4, interaction module 5, and qubit preparation process 200. Interaction module 5 can support user input and output functions, transmit input information of the user and various parameters to prediction module 4 and monitoring module 6 on demand, and display a prediction output result generated by prediction module 4 to the user. In some embodiments, monitoring module 6 can monitor test control module 3, prediction module 4, interaction module 5, and qubit preparation process 200.

In some embodiments, after prediction module 4 obtains predicted qualitative or quantitative information, the predicted qualitative and quantitative information can be further transmitted to interaction module 5 and monitoring module 6. In some embodiments, monitoring module 6 can present the transmitted predicted qualitative and quantitative information to a user. Based on the qualitative and quantitative information, the user can adaptively adjust various parameters in real time in the qubit preparation process. Such adaptive adjustments can include adjustment on a single preparation step (e.g., step n) or overall optimization on the entire qubit preparation process after the qubit preparation is completed. Thus, the preparation yield of qubits can be improved.

Figure 2:
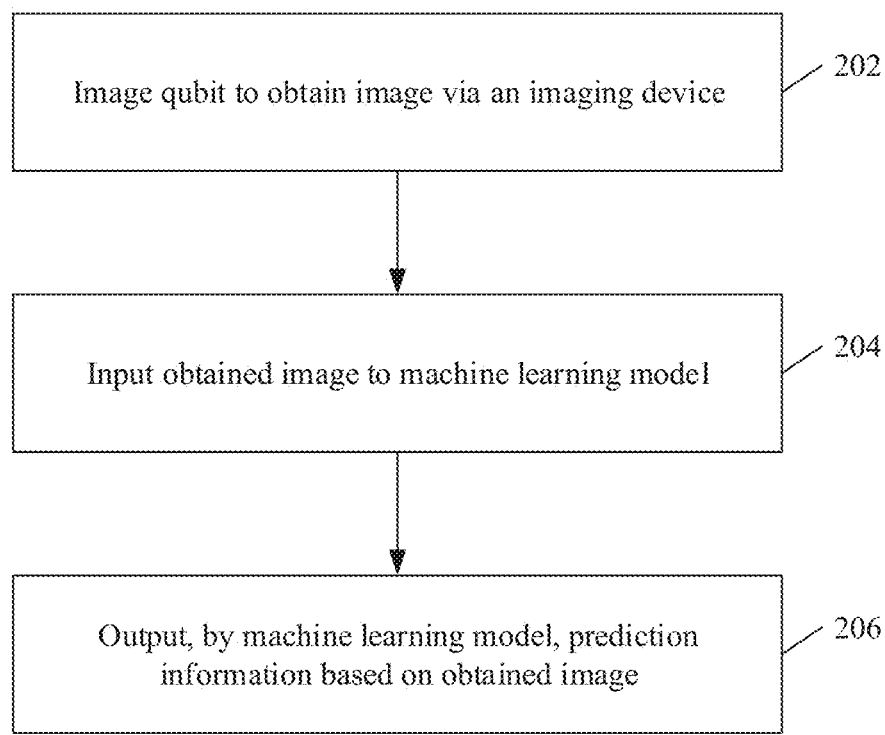
FIG. 2 is a flowchart illustrating an example method for qubit detection, consistent with some embodiments of this disclosure.

Consistent with some embodiments of this disclosure, FIG. 2 is a flowchart illustrating an example method 2000 for qubit detection, consistent with some embodiments of this disclosure. As shown in FIG. 2, method 2000 includes steps 202, 204, and 206. At step 202, a qubit can be imaged via an imaging device to obtain an image. At step 204, an image obtained at step 202 (referred to as an "obtained image" hereinafter) can be inputted to a machine learning model (e.g., trained in a training process as described herein). At step 206, the machine learning model can output prediction information based on at least the obtained image.

In some embodiments, the imaging device at step 202 can be an SEM, and the machine learning model at steps 204-206 can be a convolutional neural network (CNN).

In some embodiments, the imaging device at step 202 can be an STM, and the machine learning model at steps 204-206 can be a convolutional neural network (CNN).

In some embodiments, the imaging device at step 202 can be an imaging device in a visible light frequency range, and the machine learning model at steps 204-206 can be a convolutional neural network (CNN).

In some embodiments, the imaging device at step 202 can be an infrared imaging device, and the machine learning model at steps 204-206 can be a convolutional neural network (CNN).

In some embodiments, the imaging device at step 202 can be an ultraviolet imaging device, and the machine learning model at steps 204-206 can be a convolutional neural network (CNN).

In some embodiments, the machine learning model at steps 204-206 can be a deep neural network (DNN).

In some embodiments, the machine learning model at steps 204-206 can be a recurrent neural network (RNN).

In some embodiments, one or more processes can be chosen in a qubit preparation device process for imaging by an SEM. An obtained image can be input to a trained convolutional neural network model, and the convolutional neural network model can output prediction information based on the obtained image. By way of example, the prediction information can include quantitative information (e.g., a working frequency of the qubits, a coherence time of the qubits, a coupling strength of the qubits, or the like) or qualitative information (e.g., property classification of the qubits). Based on the prediction information, the properties of the qubits in a certain step or in certain steps can be quickly provided, and a qubit preparation process (e.g., qubit preparation process 200) can be adjusted based on the properties.

In some embodiments, one or more processes can be chosen in a qubit preparation device process for imaging by an STM. An obtained image can be input to a trained convolutional neural network model, and the convolutional neural network model can output prediction information based on the obtained image. By way of example, the prediction information can include quantitative information (e.g., a working frequency of the qubits, a coherence time of the qubits, a coupling strength of the qubits, or the like) or qualitative information (e.g., property classification of the qubits). Based on the prediction information, the properties of the qubits in a certain step or in certain steps can be quickly provided, and a qubit preparation process (e.g., qubit preparation process 200) can be adjusted based on the properties.

Various embodiments of this disclosure can integrate a qubit detection system and detection method. The system and method described in the present disclosure can provide effective integration with mass production process lines of qubits and quick estimation of the properties of qubits during or after their production and preparation process. Based on the quick estimation provided by the system and method of the present disclosure, both qubit detection and parameter adjustment and optimization of the qubit production process can be performed efficiently, thereby improving the overall yield of the qubit production line. Moreover, the parameter adjustment and optimization of the present disclosure can be performed not only after completing the qubit preparation but also in real time during the qubit preparation process, which can be more beneficial to improve the yield in the qubit production process.

Consistent with some embodiments of this disclosure, an imaging device can be used to detect qubits, and a machine learning model can be used to analyze an image obtained from quanta, thereby obtaining qualitative and quantitative information predictions of the qubits. By doing so, the cost of the technical solution of the present disclosure can be greatly reduced, and it can provide great advantages in industrial applications of mass production of qubits.

It should be understood that the above description is intended to be example rather than restrictive. For example, the above-described embodiments (and/or various aspects thereof) can be used in combination with each other. In addition, many modifications can be made without departing from the scope of some embodiments to adapt specific situations or content to the teaching of some embodiments. Although the sizes and types of materials described herein are intended to limit parameters of some embodiments, the embodiments are by no means restrictive, but are example embodiments. After the above description is reviewed, many other embodiments will be apparent to those skilled in the art. Therefore, the scope of some embodiments should be determined with reference to the appended claims and the full scope of equivalents covered by such claims. In the appended claims, the terms "comprise" and "wherein" are used as the plain language equivalents of the corresponding terms "include" and "in which." In addition, in the appended claims, the terms "first," "second," "third," or the like are used only as marks, and they are not intended to impose numerical requirements on their objects. In addition, the limitations of the appended claims are not written in a means-plus-function format unless and until such claim limitations clearly use the phrase "means for . . . " followed by a function statement without additional structure.

It should be further noted that the terms "include," "comprise," or any other variations thereof are intended to cover non-exclusive inclusion, so that a process, method, commodity, or device including a series of elements not only includes the elements, but also includes other elements not explicitly listed, or further includes elements inherent to the process, method, commodity, or device. In the absence of more limitations, an element defined by "including a/an . . . " does not exclude that the process, method, commodity, or device including the element further has other identical elements.

Those skilled in the art should understand that some embodiments of the present disclosure can be provided as a method, an apparatus, or a computer program product. Therefore, the present disclosure can be in the form of a complete hardware embodiment, a complete software embodiment, or an embodiment combining software and hardware. For example, a "module" in this disclosure can be implemented in the form of a complete hardware embodiment (e.g., circuitry), a complete software embodiment (e.g., computer instructions stored in a non-transitory computer-readable medium), or an embodiment combining software and hardware (e.g., a specific circuitry storing and executing specific computer instructions). Moreover, the present disclosure can be in the form of a computer program product implemented on one or more non-transitory computer-readable storage media (including, but not limited to, a magnetic disk memory, a CD-ROM, an optical memory, or the like) including computer-readable program code.

The non-transitory computer-readable medium (including permanent and non-permanent, removable and non-removable media) can implement information storage by means of any method or technology. The information can be computer-readable instructions, data structures, program modules, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transitory media, and the computer storage media can be used to store information that can be accessed by computing devices. As defined herein, the computer-readable medium does not include transitory computer-readable media, such as a modulated data signal and a carrier.

The protection scope of some embodiments is defined by the claims and can include other examples not explicitly described herein. If such other examples have structural elements that are not different from the literal language of the claims, or if they include equivalent structural elements that are not substantially different from the literal language of the claims, they are intended to be within the scope of the claims.

The invention claimed is:

1. A computer-implemented method for qubit detection, comprising:
    imaging, via an imaging device, a qubit to obtain an image;
    inputting the obtained image to a machine learning model;
    acquiring design information of the qubit;
    inputting the design information of the qubit to the machine learning model; and
    outputting, by the machine learning model, prediction information based on the design information and the obtained image.

2. The computer-implemented method of claim 1, further comprising:
    obtaining, via a detection device, detection data associated with the qubit;
    inputting the detection data to the machine learning model; and
    outputting, by the machine learning model, the prediction information based on the design information, the detection data, and the obtained image.

3. The computer-implemented method of claim 1, wherein the imaging device comprises a scanning electron microscope, a scanning tunneling microscope, an infrared imaging device, an ultraviolet imaging device, or an imaging device in a visible light range.

4. The computer-implemented method of claim 1, wherein imaging the qubit by the imaging device to obtain the image comprises:
    imaging the qubit after completing a qubit preparation process.

5. The computer-implemented method of claim 1, wherein the prediction information comprises at least one of quantitative information or qualitative information.

6. The computer-implemented method of claim 5, wherein the quantitative information comprises at least one of a working frequency associated with the qubit, a coherence time associated with the qubit, or a coupling strength associated with the qubit.

7. The computer-implemented method of claim 5, wherein the qualitative information comprises classification of the qubit.

8. The computer-implemented method of claim 1, wherein the machine learning model comprises a convolutional neural network, a deep neural network, or a recurrent neural network.

9. The computer-implemented method of claim 1, further comprising:
    detecting the qubit by a detection device to obtain test data;
    inputting the test data to the machine learning model; and
    outputting, by the machine learning model, the prediction information based on the test data and the obtained image.

10. A system for qubit detection, comprising:
    a test module comprising an imaging device configured to provide an image of a qubit; and
    a prediction module communicatively coupled to the test module and comprising:
        a machine learning model configured to output prediction information based on the image provided by the test module; and
        a qubit-defect determining and property-prediction module.

11. The system of claim 10, wherein the test module further comprises a detection device configured to provide detection data associated with the qubit.

12. The system of claim 10, wherein the imaging device comprises a scanning electron microscope, a scanning tunneling microscope, an infrared imaging device, an ultraviolet imaging device, or an imaging device in a visible light range.

13. The system of claim 10, wherein the machine learning model comprises a convolutional neural network, a deep neural network, or a recurrent neural network.

14. The system of claim 10, further comprising:
    a test control module arranged between and communicatively coupled to the test module and the prediction module, wherein the test control module further comprises an imaging data generation module, an imaging data reading module, a qubit test generation module, and a qubit test data reading module.

15. A device for qubit detection, comprising:
    a non-transitory computer-readable storage medium storing an instruction set; and
    one or more processors configured to execute the instruction set to cause the device to perform operations comprising:
        controlling an imaging device to image a qubit to obtain an image;
        inputting the obtained image to a machine learning model;
        acquiring design information of the qubit;
        inputting the design information of the qubit to the machine learning model; and
        controlling the machine learning model to output prediction information based on the design information and the obtained image.

16. The device of claim 15, wherein the operations further comprise:
    controlling a detection device to obtain detection data associated with the qubit;
    inputting the detection data to the machine learning model; and
    controlling the machine learning model to output the prediction information based on the design information, the detection data, and the obtained image.

17. The device of claim 15, wherein the imaging device comprises a scanning electron microscope, a scanning tunneling microscope, an infrared imaging device, an ultraviolet imaging device, or an imaging device in a visible light range.

18. The device of claim 15, wherein controlling the imaging device to image the qubit to obtain the image is performed after completing a qubit preparation process.

19. The device of claim 15, wherein the prediction information comprises at least one of quantitative information or qualitative information.

20. The device of claim 19, wherein the quantitative information comprises at least one of a working frequency associated with the qubit, a coherence time associated with the qubit, or a coupling strength associated with the qubit.

* * * * *